United States Patent
Baranowski et al.

(10) Patent No.: US 9,971,959 B2
(45) Date of Patent: May 15, 2018

(54) PERFORMING OBJECT DETECTION OPERATIONS VIA A GRAPHICS PROCESSING UNIT

(71) Applicant: NVIDIA CORPORATION, Santa Clara, CA (US)

(72) Inventors: Mateusz Jerzy Baranowski, Reda (PL); Shalini Gupta, San Francisco, CA (US); Elif Albuz, Sunnyvale, CA (US)

(73) Assignee: NVIDIA Corporation, Santa Clara, CA (US)

( * ) Notice: Subject to any disclaimer, the term of this patent is extended or adjusted under 35 U.S.C. 154(b) by 143 days.

(21) Appl. No.: 14/029,640

(22) Filed: Sep. 17, 2013

(65) Prior Publication Data
US 2014/0270551 A1 Sep. 18, 2014

Related U.S. Application Data

(60) Provisional application No. 61/794,702, filed on Mar. 15, 2013.

(51) Int. Cl.
G06K 9/62 (2006.01)
G06K 9/00 (2006.01)

(52) U.S. Cl.
CPC ....... *G06K 9/6285* (2013.01); *G06K 9/00986* (2013.01); *G06K 9/6256* (2013.01); *G06K 9/6282* (2013.01)

(58) Field of Classification Search
CPC .............. G06K 9/6285; G06K 9/6256; G06K 9/00986; G06K 9/6282
See application file for complete search history.

(56) References Cited

U.S. PATENT DOCUMENTS

| | | |
|---|---|---|
| 5,930,932 A | 8/1999 | Peterson |
| 7,349,917 B2 | 3/2008 | Forman |

(Continued)

OTHER PUBLICATIONS

Breiman (Breiman, Leo. "Random forests." Machine learning 45.1 (2001): 5-32.).*
Shotton, Jamie, Matthew Johnson, and Roberto Cipolla. "Semantic texton forests for image categorization and segmentation." Computer vision and pattern recognition, 2008. CVPR 2008. IEEE Conference on. IEEE, 2008.*

(Continued)

*Primary Examiner* — Bhavesh Mehta
*Assistant Examiner* — Menatoallah Youssef
(74) *Attorney, Agent, or Firm* — Artegis Law Group, LLP

(57) ABSTRACT

In one embodiment of the present invention, a graphics processing unit (GPU) is configured to detect an object in an image using a random forest classifier that includes multiple, identically structured decision trees. Notably, the application of each of the decision trees is independent of the application of the other decision trees. In operation, the GPU partitions the image into subsets of pixels, and associates an execution thread with each of the pixels in the subset of pixels. The GPU then causes each of the execution threads to apply the random forest classifier to the associated pixel, thereby determining a likelihood that the pixel corresponds to the object. Advantageously, such a distributed approach to object detection more fully leverages the parallel architecture of the parallel processing unit (PPU) than conventional approaches. In particular, the PPU performs object detection more efficiently using the random forest classifier than using a cascaded classifier.

17 Claims, 10 Drawing Sheets

(56) References Cited

U.S. PATENT DOCUMENTS

| | | |
|---|---|---|
| 2008/0253625 A1 | 10/2008 | Schuckers |
| 2009/0208106 A1 | 8/2009 | Dunlop |
| 2009/0281981 A1 | 11/2009 | Chen et al. |
| 2010/0202707 A1 | 8/2010 | Costache |
| 2010/0232686 A1 | 9/2010 | Dewan |
| 2011/0188737 A1 | 8/2011 | Prokhorov |
| 2011/0224542 A1 | 9/2011 | Mittal |
| 2011/0243401 A1 | 10/2011 | Zabair |
| 2011/0246409 A1 | 10/2011 | Mitra |
| 2012/0008838 A1 | 1/2012 | Guyon |
| 2012/0069003 A1 | 3/2012 | Birkbeck |
| 2012/0148162 A1 | 6/2012 | Zhang |
| 2012/0321174 A1 | 12/2012 | Tsymbal |
| 2013/0002814 A1 | 1/2013 | Park |
| 2013/0259375 A1 | 10/2013 | Dunlop |
| 2013/0322742 A1 | 12/2013 | Walton et al. |
| 2014/0035805 A1 | 2/2014 | Minnen et al. |
| 2014/0247977 A1 | 9/2014 | Han |

OTHER PUBLICATIONS

Sharp, Toby. "Implementing decision trees and forests on a GPU." Computer Vision—ECCV 2008. Springer Berlin Heidelberg, 2008. 595-608.*

Kim, Seong-Hoon, et al. "X-ray image classification using random forests with local binary patterns." Machine Learning and Cybernetics (ICMLC), 2010 International Conference on. vol. 6. IEEE, 2010.*

Zhang, Lun, et al. "Face detection based on multi-block LBP representation." International Conference on Biometrics. Springer Berlin Heidelberg, 2007.*

Li, Yi, L. O. Shapiro, and Jeff A. Bilmes. "A generative/discriminative learning algorithm for image classification." Computer Vision, 2005. ICCV 2005. Tenth IEEE International Conference on. vol. 2. IEEE, 2005.*

Non-Final Office Action U.S. Appl. No. 14/029,633, dated Sep. 9, 2015.

Non-Final Office Action for U.S. Appl. No. 14/029,633 dated Dec. 7, 2016.

* cited by examiner

PERFORMING OBJECT DETECTION OPERATIONS VIA A GRAPHICS PROCESSING UNIT

CROSS-REFERENCE TO RELATED APPLICATIONS

This application claims the priority benefit of the U.S. Provisional Patent Application having Ser. No. 61/794,702, filed on Mar. 15, 2013. The subject matter of this related application is hereby incorporated herein by reference.

BACKGROUND OF THE INVENTION

Field of the Invention

Embodiments of the present invention relate generally to computer graphics and, more specifically, to performing object detection operations via a graphics processing unit (GPU).

Description of the Related Art

Automated real-time detection of objects (e.g., faces, pets, logos, pedestrians, etc.) in images is a well-known mid-level operation in computer vision that is the enabler for many higher level computer vision operations. For instance, object detection is a precursor to tracking, scene understanding and interpretation, content based image retrieval, etc. Many computer systems configured to implement conventional object detection rely on a central processing unit (CPU). To detect whether a particular object is included in an image, the CPU typically performs two general steps. First, in a training step, the CPU uses "positive" images of the object and "negative" images of non-objects to train a statistical pattern classifier. Second, in an execution step, the CPU applies the trained pattern classifier to each pixel of an input image to determine whether a window (i.e., region) surrounding the pixel corresponds to the object. Further, to find the object at multiple scales, the CPU scales the input image to different sizes and applies the pattern classifier to each scaled image. Consequently, the CPU performs the same set of object-detection operations on a very large number of pixels across multiple scaled images.

To optimize the performance of object detection, many CPUs are configured to implement an algorithm known as a cascaded adaptive boosting classifier algorithm (CABCA). In the CABCA approach, a cascaded classifier includes a series of smaller classifiers, often of sequentially increasing complexity, that the CPU applies to each pixel in a series of discrete stages. At each stage, if the CPU determines that a particular pixel does not correspond to the object, then the CPU stops processing the pixel and begins processing the next pixel. As a result of "early terminations," the number of smaller classifiers that the CPU applies to each pixel is reduced for pixels that are not associated with the object.

Increasingly, advanced computer systems include one or more graphics processing units (GPUs), capable of very high performance using a relatively large number of small, parallel execution threads on dedicated programmable hardware processing units. The specialized design of such parallel processing subsystems usually allows these subsystems to efficiently perform certain tasks using a high volume of concurrent computational and memory operations. Because object detection involves performing a high volume of object-detection operations that may be executed concurrently across pixels and images, many advanced computer systems leverage the GPU to perform these operations. However, due to the sequential nature of the cascaded classifier and the differing number of classifiers applied to each pixel, the CABCA approach to object detection does not fully leverage the processing capabilities of GPUs.

For example, suppose that a first pixel of an image were associated with the object, but the second pixel of the image were not associated with the object. Further, suppose that the GPU were to process the image using a cascaded classifier that included 16 smaller classifiers. Finally, suppose that a first processing unit within the GPU were to determine that the first pixel was not associated with the object based on the first smaller classifier. In such a scenario, the first processing unit would cease processing the first pixel and, consequently, would be idle until the processing unit assigned to the second pixel applied the 15 remaining smaller classifiers included in the cascaded classifier to the second pixel. Since the number of processing units included in the GPU is limited, idle processing units reduce the efficiency of the GPU and limit the speed at which the computer system performs object detection.

Accordingly, what is needed in the art is a more effective technique for performing object detection operations via parallel processing architectures.

SUMMARY OF THE INVENTION

One embodiment of the present invention sets forth a computer-implemented method for identifying an object in one or more images. The method includes selecting a first subset of pixels included in a first image, associating a first execution thread with a first pixel included in the first subset of pixels, and causing the first execution thread to apply a first decision tree included in a set of multiple decision trees to the first pixel to determine a first likelihood that the first pixel is associated with a first object and thereby indicating a first probability that the first object is included in the first image, where the set of multiple decision trees is a random forest classifier.

One advantage of the disclosed approach is that the uniform structure of the random forest classifier is amenable to the parallel architecture implemented by many parallel processing units, such as graphics processing units. In particular, parallel processing units may apply the random forest classifier to multiple pixels concurrently—performing equivalent mathematical operations on each pixel. Thus, such an approach leverages the ability of a parallel processing system to efficiently perform the same instruction on multiple pixels. By contrast, the serialization and non-uniformity inherent in conventional object detection reduces the efficiency of parallel processing systems. Consequently, performing object detection using a random forest classifier is more effective than conventional object detection approaches.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
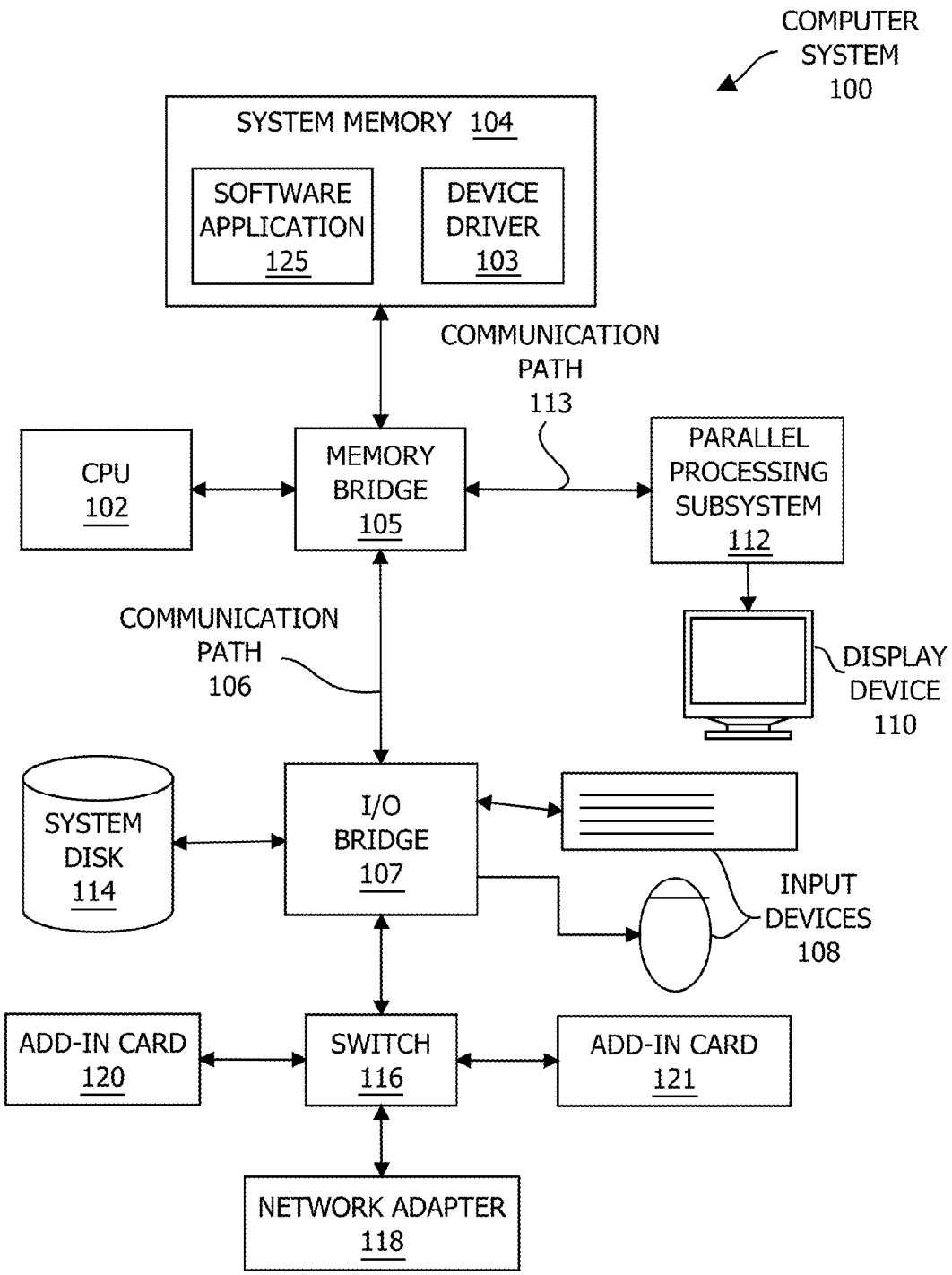
FIG. 1 is a block diagram illustrating a computer system configured to implement one or more aspects of the present invention.

FIG. 1 is a block diagram illustrating a computer system 100 configured to implement one or more aspects of the present invention. As shown, computer system 100 includes, without limitation, a central processing unit (CPU) 102 and a system memory 104 coupled to a parallel processing subsystem 112 via a memory bridge 105 and a communication path 113. Memory bridge 105 is further coupled to an I/O (input/output) bridge 107 via a communication path 106, and I/O bridge 107 is, in turn, coupled to a switch 116.

In operation, I/O bridge 107 is configured to receive user input information from input devices 108 (e.g., a keyboard, a mouse, a video/image capture device, etc.) and forward the input information to CPU 102 for processing via communication path 106 and memory bridge 105. In some embodiments, the input information is a live feed from a camera/image capture device or video data stored on a digital storage media on which object detection operations execute. Switch 116 is configured to provide connections between I/O bridge 107 and other components of the computer system 100, such as a network adapter 118 and various add-in cards 120 and 121.

As also shown, I/O bridge 107 is coupled to a system disk 114 that may be configured to store content and applications and data for use by CPU 102 and parallel processing subsystem 112. As a general matter, system disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. Finally, although not explicitly shown, other components, such as universal serial bus or other port connections, compact disc drives, digital versatile disc drives, film recording devices, and the like, may be connected to I/O bridge 107 as well.

In various embodiments, memory bridge 105 may be a Northbridge chip, and I/O bridge 107 may be a Southbridge chip. In addition, communication paths 106 and 113, as well as other communication paths within computer system 100, may be implemented using any technically suitable protocols, including, without limitation, AGP (Accelerated Graphics Port), HyperTransport, or any other bus or point-to-point communication protocol known in the art.

In some embodiments, parallel processing subsystem 112 comprises a graphics subsystem that delivers pixels to a display device 110 that may be any conventional cathode ray tube, liquid crystal display, light-emitting diode display, or the like. In such embodiments, the parallel processing subsystem 112 incorporates circuitry optimized for graphics and video processing, including, for example, video output circuitry. As described in greater detail below in FIG. 2, such circuitry may be incorporated across one or more parallel processing units (PPUs) included within parallel processing subsystem 112. In other embodiments, the parallel processing subsystem 112 incorporates circuitry optimized for general purpose and/or compute processing. Again, such circuitry may be incorporated across one or more PPUs included within parallel processing subsystem 112 that are configured to perform such general purpose and/or compute operations. In yet other embodiments, the one or more PPUs included within parallel processing subsystem 112 may be configured to perform graphics processing, general purpose processing, and compute processing operations. System memory 104 includes at least one device driver 103 configured to manage the processing operations of the one or more PPUs within parallel processing subsystem 112. The system memory 104 also includes a software application 125 that executes on the CPU 102 and may issue commands that control the operation of the PPUs.

In various embodiments, parallel processing subsystem 112 may be integrated with one or more other the other elements of FIG. 1 to form a single system. For example, parallel processing subsystem 112 may be integrated with CPU 102 and other connection circuitry on a single chip to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For example, in some embodiments, system memory 104 could be connected to CPU 102 directly rather than through memory bridge 105, and other devices would communicate with system memory 104 via memory bridge 105 and CPU 102. In other alternative topologies, parallel processing subsystem 112 may be connected to I/O bridge 107 or directly to CPU 102, rather than to memory bridge 105. In still other embodiments, I/O bridge 107 and memory bridge 105 may be integrated into a single chip instead of existing as one or more discrete devices. Lastly, in certain embodiments, one or more components shown in FIG. 1 may not be present. For example, switch 116 could be eliminated, and network adapter 118 and add-in cards 120, 121 would connect directly to I/O bridge 107.

Figure 2:
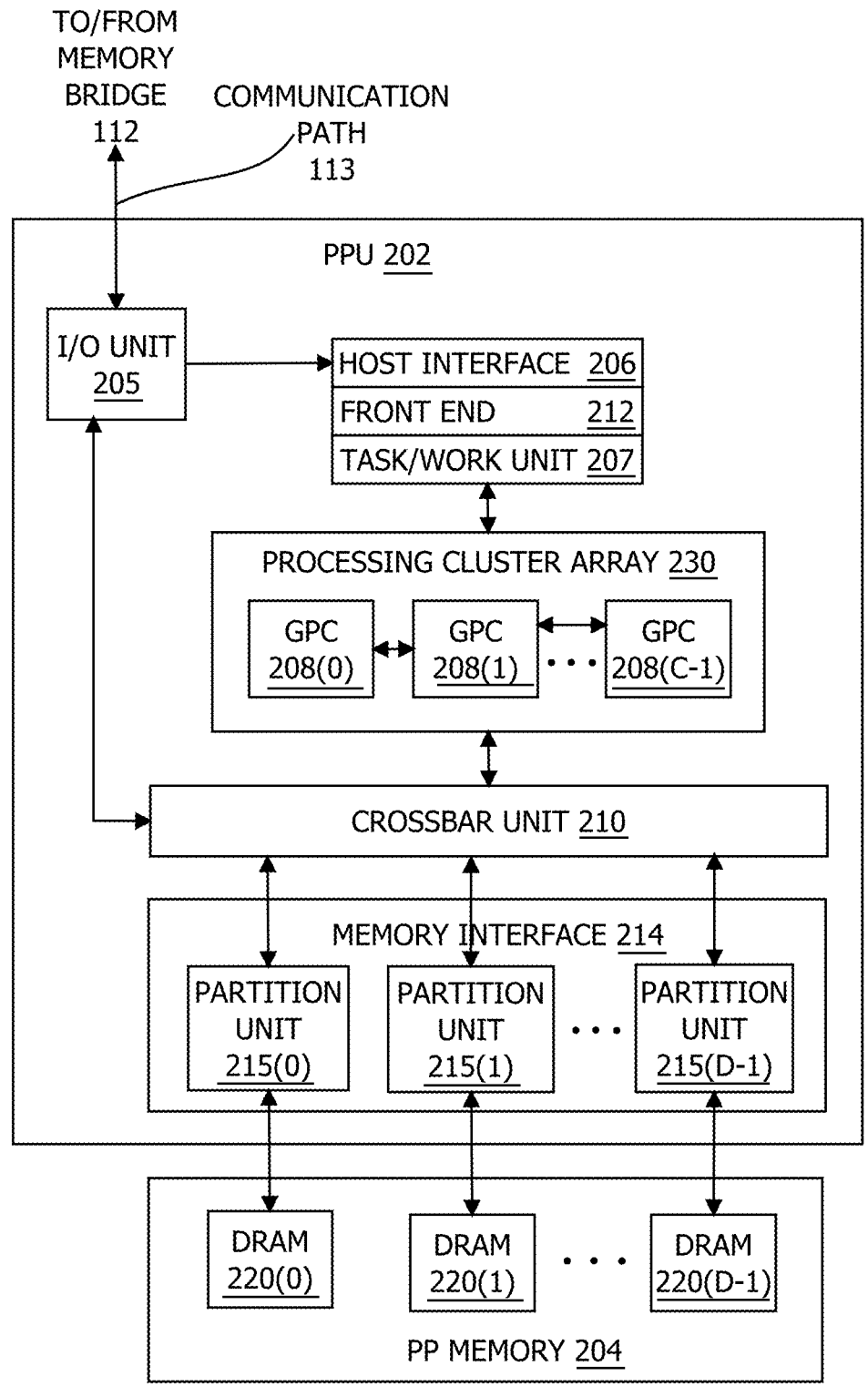
FIG. 2 is a block diagram of a parallel processing unit included in the parallel processing subsystem of FIG. 1, according to one embodiment of the present invention.

FIG. 2 is a block diagram of a parallel processing unit (PPU) 202 included in the parallel processing subsystem 112 of FIG. 1, according to one embodiment of the present invention. Although FIG. 2 depicts one PPU 202, as indicated above, parallel processing subsystem 112 may include any number of PPUs 202. As shown, PPU 202 is coupled to a local parallel processing (PP) memory 204. PPU 202 and PP memory 204 may be implemented using one or more integrated circuit devices, such as programmable processors, application specific integrated circuits (ASICs), or memory devices, or in any other technically feasible fashion.

In some embodiments, PPU 202 comprises a graphics processing unit (GPU) that may be configured to implement a graphics rendering pipeline to perform various operations related to generating pixel data based on graphics data supplied by CPU 102 and/or system memory 104. When processing graphics data, PP memory 204 can be used as graphics memory that stores one or more conventional frame buffers and, if needed, one or more other render targets as well. Among other things, PP memory 204 may be used to store and update pixel data and deliver final pixel data or display frames to display device 110 for display. In some embodiments, PPU 202 also may be configured for general-purpose processing and compute operations.

In operation, CPU 102 is the master processor of computer system 100, controlling and coordinating operations of other system components. In particular, CPU 102 issues commands that control the operation of PPU 202. In some embodiments, CPU 102 writes a stream of commands for PPU 202 to a data structure (not explicitly shown in either FIG. 1 or FIG. 2) that may be located in system memory 104, PP memory 204, or another storage location accessible to both CPU 102 and PPU 202. A pointer to the data structure is written to a pushbuffer to initiate processing of the stream of commands in the data structure. The PPU 202 reads command streams from the pushbuffer and then executes commands asynchronously relative to the operation of CPU 102. In embodiments where multiple pushbuffers are generated, execution priorities may be specified for each pushbuffer by an application program via device driver 103 to control scheduling of the different pushbuffers.

As also shown, PPU 202 includes an I/O (input/output) unit 205 that communicates with the rest of computer system 100 via the communication path 113 and memory bridge 105. I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to PP memory 204) may be directed to a crossbar unit 210. Host interface 206 reads each pushbuffer and transmits the command stream stored in the pushbuffer to a front end 212.

As mentioned above in conjunction with FIG. 1, the connection of PPU 202 to the rest of computer system 100 may be varied. In some embodiments, parallel processing subsystem 112, which includes at least one PPU 202, is implemented as an add-in card that can be inserted into an expansion slot of computer system 100. In other embodiments, PPU 202 can be integrated on a single chip with a bus bridge, such as memory bridge 105 or I/O bridge 107. Again, in still other embodiments, some or all of the elements of PPU 202 may be included along with CPU 102 in a single integrated circuit or system of chip (SoC).

In operation, front end 212 transmits processing tasks received from host interface 206 to a work distribution unit (not shown) within task/work unit 207. The work distribution unit receives pointers to processing tasks that are encoded as task metadata (TMD) and stored in memory. The pointers to TMDs are included in a command stream that is stored as a pushbuffer and received by the front end unit 212 from the host interface 206. Processing tasks that may be encoded as TMDs include indices associated with the data to be processed as well as state parameters and commands that define how the data is to be processed. For example, the state parameters and commands could define the program to be executed on the data. The task/work unit 207 receives tasks from the front end 212 and ensures that GPCs 208 are configured to a valid state before the processing task specified by each one of the TMDs is initiated. A priority may be specified for each TMD that is used to schedule the execution of the processing task. Processing tasks also may be received from the processing cluster array 230. Optionally, the TMD may include a parameter that controls whether the TMD is added to the head or the tail of a list of processing tasks (or to a list of pointers to the processing tasks), thereby providing another level of control over execution priority.

PPU 202 advantageously implements a highly parallel processing architecture based on a processing cluster array 230 that includes a set of C general processing clusters (GPCs) 208, where $C \geq 1$. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary depending on the workload arising for each type of program or computation.

Memory interface 214 includes a set of D partition units 215, where $D \geq 1$. Each partition unit 215 is coupled to one or more dynamic random access memories (DRAMs) 220 residing within PPM memory 204. In one embodiment, the number of partition units 215 equals the number of DRAMs 220, and each partition unit 215 is coupled to a different DRAM 220. In other embodiments, the number of partition units 215 may be different than the number of DRAMs 220. Persons of ordinary skill in the art will appreciate that a DRAM 220 may be replaced with any other technically suitable storage device. In operation, various render targets, such as texture maps and frame buffers, may be stored across DRAMs 220, allowing partition units 215 to write portions of each render target in parallel to efficiently use the available bandwidth of PP memory 204.

A given GPCs 208 may process data to be written to any of the DRAMs 220 within PP memory 204. Crossbar unit 210 is configured to route the output of each GPC 208 to the input of any partition unit 215 or to any other GPC 208 for further processing. GPCs 208 communicate with memory interface 214 via crossbar unit 210 to read from or write to various DRAMs 220. In one embodiment, crossbar unit 210 has a connection to I/O unit 205, in addition to a connection to PP memory 204 via memory interface 214, thereby enabling the processing cores within the different GPCs 208 to communicate with system memory 104 or other memory not local to PPU 202. In the embodiment of FIG. 2, crossbar unit 210 is directly connected with I/O unit 205. In various embodiments, crossbar unit 210 may use virtual channels to separate traffic streams between the GPCs 208 and partition units 215.

Again, GPCs 208 can be programmed to execute processing tasks relating to a wide variety of applications, including, without limitation, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel/fragment shader programs), general compute operations, etc. In operation, PPU 202 is configured to transfer data from system memory 104 and/or PP memory 204 to one or more on-chip memory units, process the data, and write result data back to system memory 104 and/or PP memory 204. The result data may then be accessed by other system components, including CPU 102, another PPU 202 within parallel processing subsystem 112, or another parallel processing subsystem 112 within computer system 100.

As noted above, any number of PPUs 202 may be included in a parallel processing subsystem 112. For example, multiple PPUs 202 may be provided on a single add-in card, or multiple add-in cards may be connected to communication path 113, or one or more of PPUs 202 may be integrated into a bridge chip. PPUs 202 in a multi-PPU system may be identical to or different from one another. For example, different PPUs 202 might have different numbers of processing cores and/or different amounts of PP memory 204. In implementations where multiple PPUs 202 are present, those PPUs may be operated in parallel to process data at a higher throughput than is possible with a single PPU 202. Systems incorporating one or more PPUs 202 may be implemented in a variety of configurations and form factors, including, without limitation, desktops, laptops, handheld personal computers or other handheld devices, servers, workstations, game consoles, embedded systems, and the like.

Figure 3:
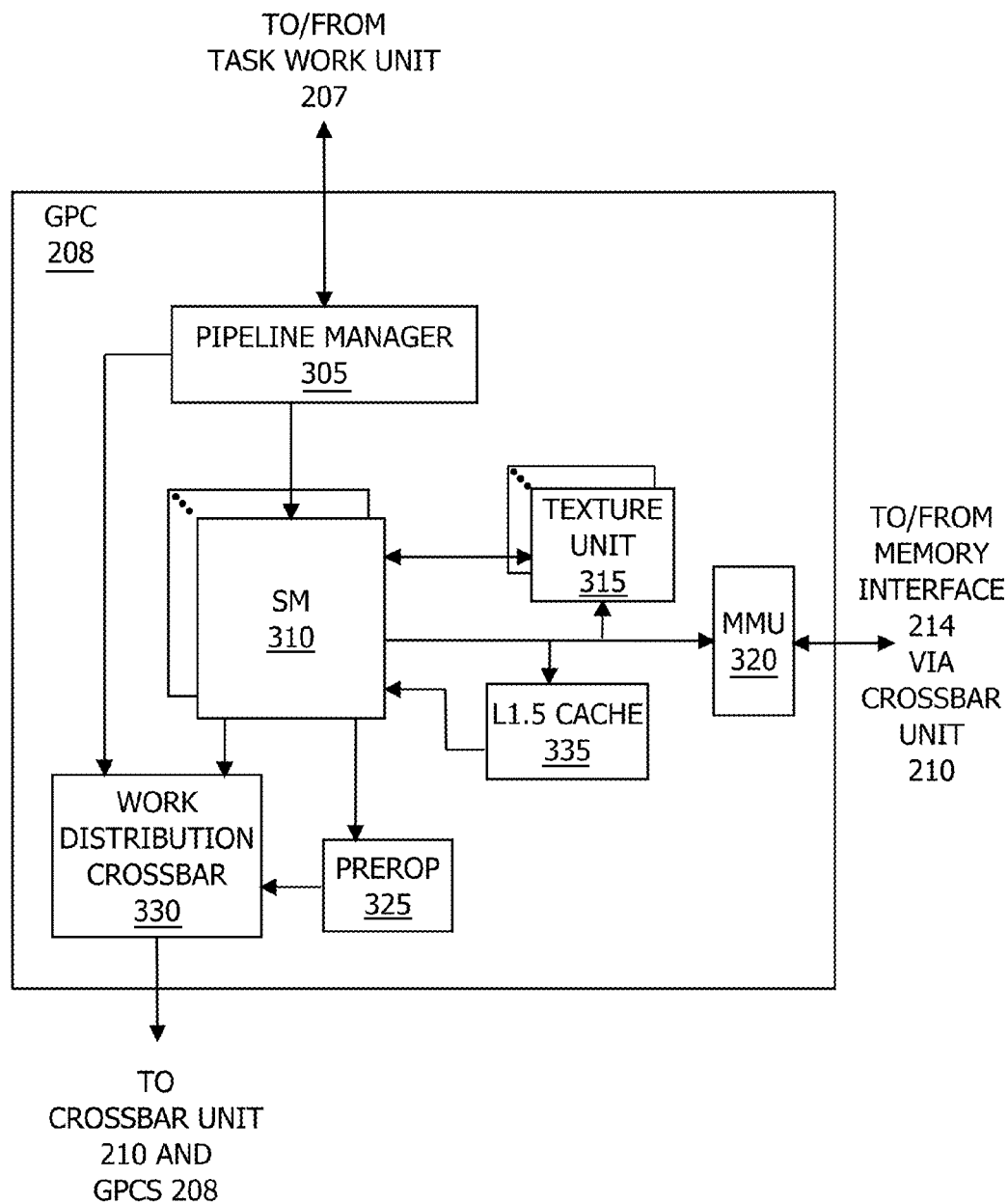
FIG. 3 is a block diagram of a general processing cluster included in the parallel processing unit of FIG. 2, according to one embodiment of the present invention.

FIG. 3 is a block diagram of a GPC 208 included in PPU 202 of FIG. 2, according to one embodiment of the present invention. In operation, GPC 208 may be configured to execute a large number of threads in parallel to perform graphics, general processing and/or compute operations. As used herein, a "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within GPC 208. Unlike a SIMD execution regime, where all processing engines typically execute identical instructions, SIMT execution allows different threads to more readily follow divergent execution paths through a given program. Persons of ordinary skill in the art will understand that a SIMD processing regime represents a functional subset of a SIMT processing regime.

Operation of GPC 208 is controlled via a pipeline manager 305 that distributes processing tasks received from a work distribution unit (not shown) within task/work unit 207 to one or more streaming multiprocessors (SMs) 310. Pipeline manager 305 may also be configured to control a work distribution crossbar 330 by specifying destinations for processed data output by SMs 310.

In one embodiment, GPC 208 includes a set of P of SMs 310, where P≥1. Also, each SM 310 includes a set of functional execution units (not shown), such as execution units and load-store units. Processing operations specific to any of the functional execution units may be pipelined, which enables a new instruction to be issued for execution before a previous instruction has completed execution. Any combination of functional execution units within a given SM 310 may be provided. In various embodiments, the functional execution units may be configured to support a variety of different operations including integer and floating point arithmetic (e.g., addition and multiplication), comparison operations, Boolean operations (AND, OR, XOR), bit-shifting, and computation of various algebraic functions (e.g., planar interpolation and trigonometric, exponential, and logarithmic functions, etc.). Advantageously, the same functional execution unit can be configured to perform different operations.

In operation, each SM 310 is configured to process one or more thread groups. As used herein, a "thread group" or "warp" refers to a group of threads concurrently executing the same program on different input data, with one thread of the group being assigned to a different execution unit within an SM 310. A thread group may include fewer threads than the number of execution units within the SM 310, in which case some of the execution may be idle during cycles when that thread group is being processed. A thread group may also include more threads than the number of execution units within the SM 310, in which case processing may occur over consecutive clock cycles. Since each SM 310 can support up to G thread groups concurrently, it follows that up to G*P thread groups can be executing in GPC 208 at any given time.

Additionally, a plurality of related thread groups may be active (in different phases of execution) at the same time within an SM 310. This collection of thread groups is referred to herein as a "cooperative thread array" ("CTA") or "thread array." The size of a particular CTA is equal to p*k, where k is the number of concurrently executing threads in a thread group, which is typically an integer multiple of the number of execution units within the SM 310, and p is the number of thread groups simultaneously active within the SM 310.

Although not shown in FIG. 3 each SM 310 contains a level one (L1) cache or uses space in a corresponding L1 cache outside of the SM 310 to support, among other things, load and store operations performed by the execution units. Each SM 310 also has access to level two (L2) caches (not shown) that are shared among all GPCs 208 in PPU 202. The L2 caches may be used to transfer data between threads. Finally, SMs 310 also have access to off-chip "global" memory, which may include PP memory 204 and/or system memory 104. It is to be understood that any memory external to PPU 202 may be used as global memory. Additionally, as shown in FIG. 3, a level one-point-five (L1.5) cache 335 may be included within GPC 208 and configured to receive and hold data requested from memory via memory interface 214 by SM 310. Such data may include, without limitation, instructions, uniform data, and constant data. In embodiments having multiple SMs 310 within GPC 208, the SMs 310 may beneficially share common instructions and data cached in L1.5 cache 335.

Each GPC 208 may have an associated memory management unit (MMU) 320 that is configured to map virtual addresses into physical addresses. In various embodiments, MMU 320 may reside either within GPC 208 or within the memory interface 214. The MMU 320 includes a set of page table entries (PTEs) used to map a virtual address to a physical address of a tile or memory page and optionally a cache line index. The MMU 320 may include address translation lookaside buffers (TLB) or caches that may reside within SMs 310, within one or more L1 caches, or within GPC 208.

In graphics and compute applications, GPC 208 may be configured such that each SM 310 is coupled to a texture unit 315 for performing texture mapping operations, such as determining texture sample positions, reading texture data, and filtering texture data.

In operation, each SM 310 transmits a processed task to work distribution crossbar 330 in order to provide the processed task to another GPC 208 for further processing or to store the processed task in an L2 cache (not shown), parallel processing memory 204, or system memory 104 via crossbar unit 210. In addition, a pre-raster operations (preROP) unit 325 is configured to receive data from SM 310, direct data to one or more raster operations (ROP) units within partition units 215, perform optimizations for color blending, organize pixel color data, and perform address translations.

It will be appreciated that the core architecture described herein is illustrative and that variations and modifications are possible. Among other things, any number of processing units, such as SMs 310, texture units 315, or preROP units 325, may be included within GPC 208. Further, as described above in conjunction with FIG. 2, PPU 202 may include any number of GPCs 208 that are configured to be functionally similar to one another so that execution behavior does not depend on which GPC 208 receives a particular processing task. Further, each GPC 208 operates independently of the other GPCs 208 in PPU 202 to execute tasks for one or more application programs. In view of the foregoing, persons of ordinary skill in the art will appreciate that the architecture described in FIGS. 1-3 in no way limits the scope of the present invention.

Performing Object Detection Operations

Again, the software application 125 configures the PPU 202 to execute a large number of threads in parallel to perform graphics, general processing and/or compute operations. In particular, the PPU 202 is configured to operations as part of detecting instances of an object or class of object (e.g., faces, pets, logos, pedestrians, etc.) at multiple scales in images. In some embodiments, the CPU 102 and the PPU 202 may be configured to collaboratively perform object detection in two general steps—a training step and an execution step. Advantageously, the CPU 102 and the PPU 202 are configured to implement object detection using multi-block local binary pattern (MB-LBP) features that efficiently capture discriminatory image structures in conjunction with a random forest classifier (RF) that is amenable the parallel architecture of the PPU 202.

In one embodiment, the CPU 102 performs the training step in two sequential phases. First, in an initial phase, the CPU 102 trains the RF classifier to distinguish between images that include objects (also referred to herein as objects of interest) and non-objects (also referred to herein as objects not of interest) based on an initial pool of MB-LBP features. Notably, the CPU 102 randomly selects the initial pool of MB-LBP features from a relatively large set of possible MB-LBP features. The CPU 102 then analyzes the trained RF classifier to judiciously select a reduced pool of MB-LPB features that optimally discriminate between the objects and the non-objects. Subsequently, in a reduced phase, the CPU 102 resets the RF classifier to an initial state and retrains the RF classifier based on the reduced pool of MB-LBP features. Since the CPU 120 selects the reduced pool of MB-LBP features based on the demonstrated discriminatory capability of the MB-LBP features, the effectiveness of the retrained RF classifier is increased compared to the initially trained RF classifier. As a result, the depth and breadth of the RF classifier may be reduced compared to conventionally-trained classifiers—without sacrificing accuracy. Thus, the time and memory required to perform object detection using the RF classifier may be reduced while the accuracy of the results is increased.

After the CPU 102 trains the RF classifier, the CPU 102 and the PPU 202 collaborate to perform the execution step of object detection. Notably, the CPU 102 applies the RF classifier to multiple scaled versions of an input image, thereby performing object detection at multiple scales in the input image. The PPU 202 subdivides each scaled image into groups of pixels and copies the image data associated with each group of pixels, known as a "memory patch," from the system memory 104 to the PP memory 204. For each group of pixels, the PPU 202 associates a different thread with each pixel included in the group of pixels and then causes the threads to concurrently process the group of pixels. More specifically, each thread operates on image data included in the memory patch, computes the MB-LBP feature of the associated pixel, and applies the RF classifier to the associated pixel to determine whether the pixel is associated with the object of interest. Advantageously, the PPU 202 applies the same number and type of operations to each pixel, thereby exploiting the SIMD capabilities of the PPU 202. By contrast, a processing unit that performs object detection using a conventional cascaded classifier typically applies a different number and/or type of operations to each pixel and, consequently, does not fully leverage the parallel processing capabilities of the processing unit.

Figure 4:
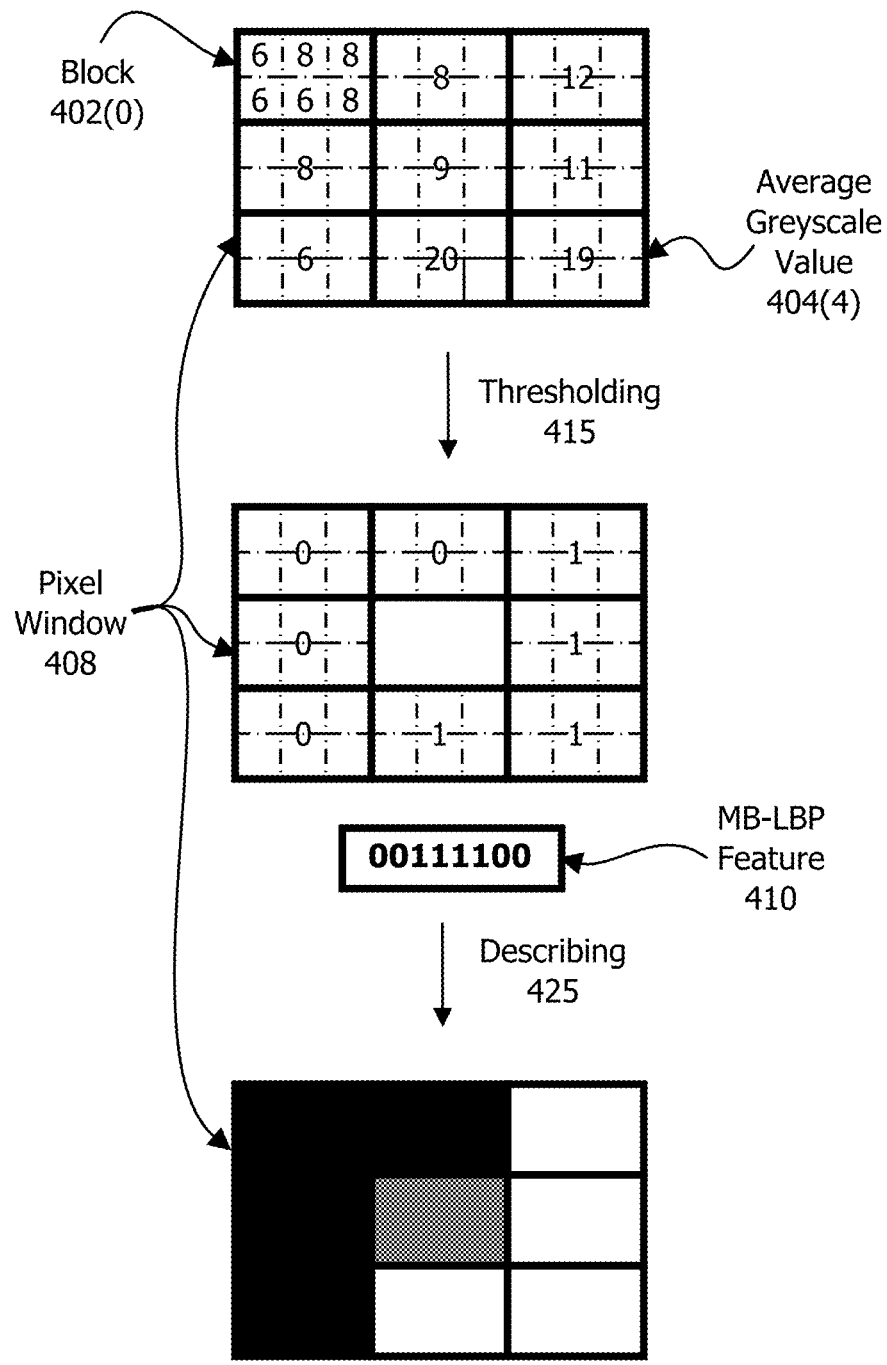
FIG. 4 is a conceptual diagram illustrating how a multi-block local binary pattern feature may be computed, according to one embodiment of the present invention.

FIG. 4 is a conceptual diagram illustrating how a multi-block local binary pattern (MB-LBP) 410 feature may be computed, according to one embodiment of the present invention. Each MB-MBP feature 410 is associated with a particular pixel and, together, a set of MB-LBP features 410 encode local image textures—effectively capturing a diverse range of image structures across a wide variety of scales and location. Advantageously, the MB-LPB features 410 are robust to local illumination variations, encode signal differences in all direction, and are easy to compute. By contrast, Haar features (an alternative feature representation) are less robust to illumination conditions and do not encode differences in the signal in all directions.

As part of the training step, the PPU 202 computes the MB-LBP features 410 associated with images of the objects of interest and images of objects not of interest. Subsequently, as part of the execution step, the PPU 202 computes the MB-LBP features 410 associated with input images and re-sized version of the input images. In some embodiments, the PPU 202 computes the MB-LBP 410 features across multiple sequential image frames (e.g., video). In alternate embodiments, the CPU 102 may be configured to compute the MB-LBP features 410 of the images of the objects of interest and images not of interest instead of or in conjunction with the PPU 202. In other embodiments, the CPU 102 may be configured to compute the MB-LBP features 410 of the input images and re-sized version of the input images instead of or in conjunction with the PPU 202. In operation, prior to computing the MB-LBP feature 410, the CPU 102 creates a greyscale of the image and calculates an associated data structure known as an "integral image." The integral image enables the PPU 202 to efficiently compute the average of the greyscale values included in a fixed sized block of pixels.

The PPU 202 computes the MB-LBP feature 410 of a particular pixel based on the greyscale values of the pixels included in a proximally-located group of pixels known as a pixel window 408. As shown, the pixel window 408 is a two-dimensional array of fifty-four pixels, arranged in six rows and nine columns. Each pixel window 408 includes nine fixed-sized blocks 402 of pixels arranged in three rows and three columns. As explicitly illustrated for the upper-left block 402(0), each block 402 is a two-dimensional array of six pixels, arranged in two rows and three columns. In alternate embodiments, the pixel window 408 and the blocks 402 included in the pixel window 408 may be of any dimension and aspect ratio. Further, for a particular pixel, the corresponding pixel window 408 may be determined in any technically feasible fashion. For instance, for a pixel at a location (4,3), the pixel window 408 may include pixels included in the rectangular region bounded by the location (0,0) and the location (9, 6). Alternatively, the pixel window 408 may include pixels in the rectangular region bounded by the location (4, 3) and the location (13, 9).

In operation, the PPU 202 computes the MB-LBP feature 410 of the pixel in two steps. In the first step, the PPU 202 computes the average greyscale value 404 of each of the nine blocks 402. As shown, the block 402(0) includes the greyscale values 6, 8, 8, 6, 6, and 8. Consequently, the PPU 202 computes a value of seven for the average greyscale value 404(0) of the block 402(0.) As also shown, the PPU 202 computes a value of nine for the average greyscale value 404(8) of a central block 402(8), a value of nineteen for the average greyscale value 404(4) of the lower-right block 402(4), and values of eight, twelve, eleven, twenty, six, and eight for the average greyscale values 404 of the remaining blocks 402.

In the second step—thresholding 415—the PPU 202 generate the values that represent the MB-LBP feature 410. In operation, the PPU 202 subtracts the average greyscale value of the central block 402 from each of the average grayscale values 404 of the eight blocks 402 that surround the central block 404. The PPU 202 then encodes the signs of these differences. If the sign of the difference associated with a particular block 402 is strictly negative, then the PPU 202 sets the sign value associated with the particular block 402 to binary '0.' By contrast, if the sign of the difference associated with a particular block 402 is not strictly negative, then the PPU 202 sets the sign value associated with the particular block 402 to binary '0.' As shown, the PPU 202 computes eight sign values 0, 0, 1, 1, 1, 1, 0, and 0. Subsequently, the PPU 202 performs a concatenation operation on the eight sign values to compute the MB-LBP feature 410 as "00111100."

The MB-LBP feature 410 may be visually expressed— describing 425. The grey rectangle represents the central block 402, the black rectangles represent the blocks 402 associated with sign values of '0,' and the unfilled rectangles represent the blocks 402 associated with sign values of '1.'

Figure 5:
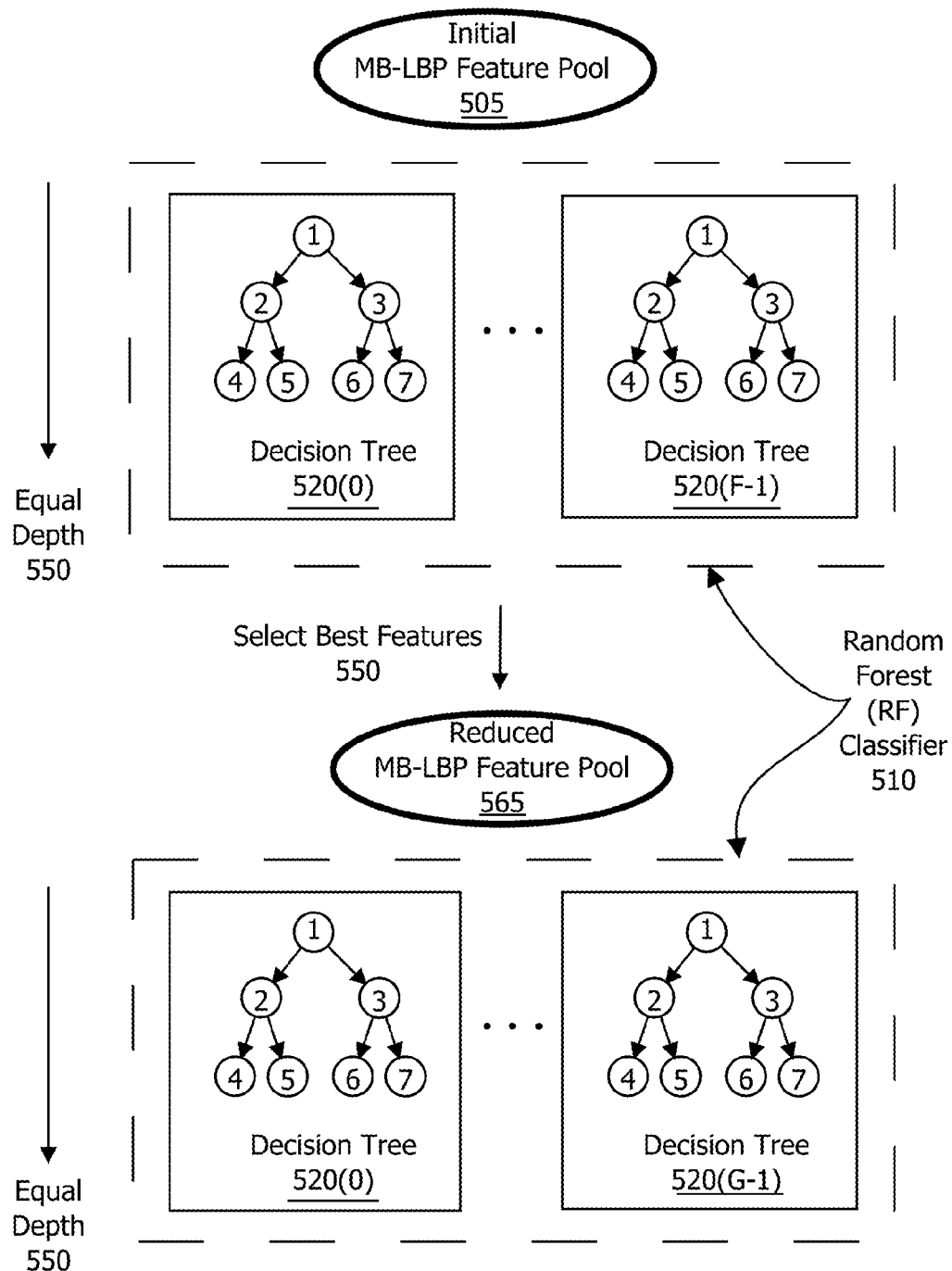
FIG. 5 is a conceptual diagram illustrating how a random forest classifier may be trained, according to one embodiment of the present invention.

FIG. 5 is a conceptual diagram illustrating how a random forest (RF) classifier 510 may be trained, according to one embodiment of the present invention. As persons skilled in the art will recognize, the quantity of operations required to perform the training phase of object detection is substantially greater than the quantity of operations required to perform the execution phase of object detection. Further, the vast majority of the operations required to perform the execution phase of object detection are decision operations that discriminate between objects and non-objects. Advantageously, the CPU 102 trains the RF classifier 510 in two steps designed to both reduce the number of the decision operations required to accurately discriminate between objects and non-objects and improve the detection accuracy compared to conventional classifiers.

As shown, the RF classifier 510 includes one or more identically-structured, independent decision trees 520. Notably, the CPU 102 initially configures the RF classifier 510 to include a set of F independent decision trees 520, where F≥1. Subsequently, the CPU 102 resets the RF classifier 410 to include a set of G independent decision trees 520, where F≥G≥1. For instance, the CPU 102 may initially configure the RF classifier 510 to include 1024 decision trees 520 and, subsequently, the CPU 102 may reset the RF classifier 510 to include 32 decision trees 520. In operation, the CPU 102 may reduce the number of the decision trees 520 included in the RF classifier 410 in conjunction with optimizing the subset of MB-LBP features 410 used to train the RF classifier 510. Notably, each of the decision trees 520 is of an equal depth 550 and includes identically structured branches. In alternate embodiments, the CPU 102 may alter the equal depth 550 in conjunction with resetting the RF classifier 510. However, across a particular trained RF classifier 510, the decision trees 520 are of the equal depth 550.

As shown, the CPU 102 initially creates the RF classifier 510 and trains the RF classifier 510 based on an initial MB-LBP feature pool 505. Notably, the initial MB-LBP feature pool 505 is a randomly-selected subset of the set of all possible MB-LBP features 410. In general, the set of all possible MB-LBP features 410 is substantially larger than the randomly selected MB-LBP feature pool 505. The CPU 102 may generate the initial MB-LBP feature pool 505 in any technically feasible fashion. For instance, as persons skilled in the art will understand, the CPU 102 may generate the initial MB-LBP feature pool 505 via bagging.

Subsequently, for each decision tree 520 included in the RF classifier 510, the CPU 102 selects a random subset of features from the initial MB-LBP feature pool 505. The CPU 102 then trains each decision tree 520 on a set of "positive" images that include objects of interest and a set of "negative" images that do not include objects of interest. At each split in the decision tree 520, the CPU 102 randomly selects a subset of the MB-LBP feature 410 included in the decision tree 520. The CPU 102 then analyzes this subset of the initial MB-LBP feature pool 505 to determine the MB-LBP feature 410 that most accurately discriminates between the positive images and the negative images. The CPU 102 selects this locally most discriminatory MB-LBP feature 410 for the split.

After the CPU 102 trains all of the decision trees 520(0) through 520(F−1), the CPU 102 analyzes the initially trained RF classifier 510 to compute the frequency with which each of the MB-LBP features 410 appears as a split in the decision trees 520. In general, the CPU 102 assesses the discriminatory capability of a particular MB-LBP feature 410 based on this frequency. For instance, in some embodiments, the CPU 102 may be configured to determine that any MB-LBP feature 410 that appears as a split less than six times in the 1024 decision trees 520 has no valuable discriminatory capability. In general, the CPU 102 selects the subset of the most discriminatory MB-LBP features 410 as a reduced MB-LBP feature pool 565. For instance, in some embodiments, the CPU 102 selects all of the MB-LBP features 410 that appear as a split more than eight times in the decision trees 520.

The CPU 102 then resets the RF classifier 510 to an untrained state. In some embodiments, the CPU 102 also reduces the number of decision trees 520 included in the RF classifier 510. Subsequently, for each of the decision trees 520(0) through 520(F−1), the CPU 102 selects a random subset of features from the reduced MB-LBP feature pool 565. The CPU 102 retrains each decision tree 520 on the set of positive images and the set of negative images. At each split in the decision tree 520, the CPU 102 randomly selects a subset of the MB-LBP features 410 included in the decision tree 520. The CPU 102 then analyzes this subset of the reduced MB-LBP feature pool 565 to determine the MB-LBP feature 410 that most accurately discriminates between the positive images and the negative images. The CPU 102 selects this locally most discriminatory MB-LBP feature 410 for the split.

Advantageously, this two-pass training technique deterministically improves the performance of the RF classifier 510. In particular, the accuracy with which the RF classifier 510 detects objects is improved compared to comparably sized conventionally-trained classifiers. Further, the software application 125 may tune the equal depth 510 of the RF classifier 510 and/or the number of the decision trees 520 included in the RF classifier 510 based on the time and accuracy constraints of the software application 125. In alternate embodiments, the PPU 202 may be configured to perform one or more operations included in the training step.

Figure 6:
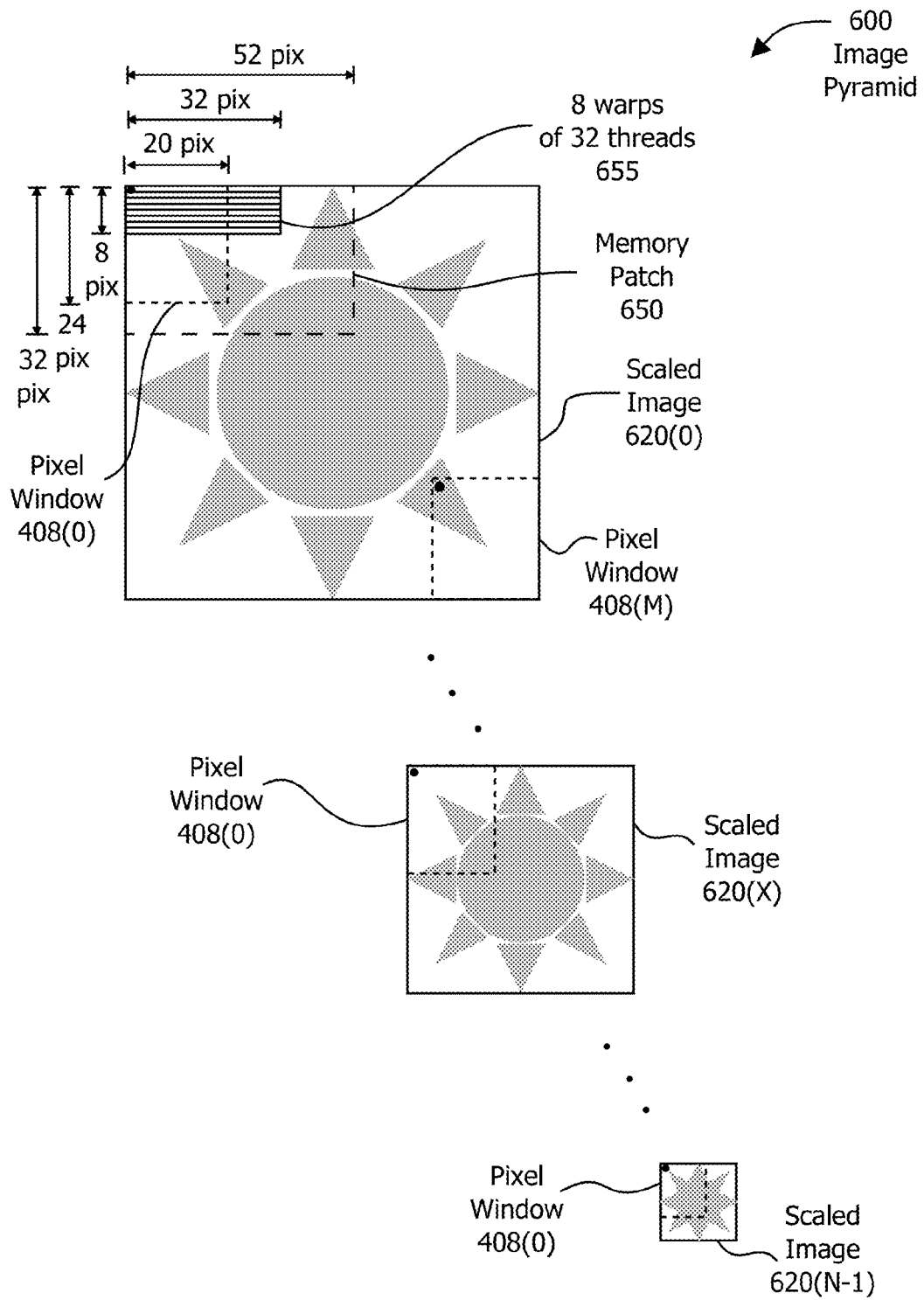
FIG. 6 is a conceptual diagram of an image pyramid, according to one embodiment of the present invention.

FIG. 6 is a conceptual diagram of an image pyramid 600, according to one embodiment of the present invention. To detect objects in an input image at a variety of different scales, the CPU 102 performs resizing operations on the input image to generate the image pyramid 600. Subsequently, the CPU 102 and the PPU 202 collaborate to perform object detection across the image pyramid 600.

As shown, the image pyramid 600 includes a set of N scaled images 620, where N≥1. Each of the scaled images 620 represents the input image at a different magnification. For example, a first scaled image 620(0) may represent an upsized version of the input image, a second scaled image 620(1) may represent the original image, and a third scaled image 620(2) may represent a downsized version of the input image.

For each of the scaled images 620, the CPU 102 generates a greyscale of the image and computes the integral image associated with the scaled image 620. As previously noted herein, the CPU 102 then divides the scaled image 620 into memory patches 650. Each memory patch 650 is associated with a group of pixels. Further, each pixel is associated with a particular pixel window 408. The size and aspect ratio of the memory patch 650 and the pixel window 408 may be determined in any technically feasible fashion. For instance, the CPU 102 may determine the size and aspect ratio of the pixel window 408 based on the number of threads in the warp. Further, the CPU 102 may determine the size and aspect ratio of the memory patch based on the size and aspect ratio of the pixel window 408 and the architecture of the PPU 202.

As part of the execution step of object detection, the PPU 202 copies the trained RF classifier 510 from the system memory 104 to the PP memory 204. Subsequently, the PPU 202 selects a group of pixels and assigns a different thread to each pixel included in the group of pixels. The PPU 202 selects a particular scaled image 620 and copies the memory patch 650 associated with both the selected group of pixels and the selected scaled image 620 from the system memory 104 to the PP memory 204. The PPU 202 then causes the threads to concurrently apply the RF classifier 510 to the pixels included in the group of pixels. The PPU 202 may store and apply the RF classifier 510 in any technically feasible fashion. For instance, the PPU 202 may store the RF classifier 510 in tabular form in breadth-first search order and, as the PPU 202 processes the group of pixels, the different threads access variable locations of the table. In alternate embodiments, the PPU 202 may assign any number of threads to process any number of pixels and may not process all of the pixels included in all of the scaled images 620. For example, in some embodiments, the PPU 202 is configured to process only alternate pixels included in larger scaled images 620.

First, each thread computes the required MB-LBP features 410 of the assigned pixel based on the subset of data included in memory patch 650 that corresponds to the pixel window 408 associated with the assigned pixel. Subsequently, each thread sequentially applies each decision tree 520 included in the RF classifier 510 to the assigned pixel. Finally, each thread generates an object confidence value that represents the likelihood of the presence of the object at the location of the assigned pixel based on the individual determinations of each of the decision trees 520.

As shown, in one embodiment, each pixel window 408 includes 480 pixels arranged in 20 columns and 24 rows. Consequently, as previously disclosed herein, the MB-LBP feature 410 associated with each pixel is computed based on a group of 480 pixels. Further, each memory patch 650 includes the image data for 256 pixel windows 408 arranged in 32 columns and 8 rows. Thus, each memory patch 650 includes image data for 1664 pixels arranged in 52 columns and 32 rows. The image data included in a particular memory patch 650 enables the PPU 202 to determine the MB-LBP features 410 associated with a group of 256 pixels arranged in 32 columns and 8 rows for a particular scaled image 620. In operation, each thread included in an "8 warps of 32 threads" 655 processes one of the 256 pixel windows 408 associated with each memory patch 650. As shown, together, the 8 warps of 32 threads 655 apply the RF classifier 510 to 256 pixels, thereby processing the upper-left memory patch 650 included in the scaled image 620(0).

The PPU 202 continues to process groups of pixels and scaled images 620 until the PPU 202 has computed an object confidence value for each pixel and each scaled image 620 included in the image pyramid 600. The CPU 102 then completes the execution step of the object detection process. In operation, the CPU 102 determines detections based on the per-pixel, per-scaled image object confidence values computed by the PPU 202. If the CPU 102 determines that an object confidence value is greater than a predetermined threshold, then the CPU considers the object confidence value to represent a "detection" associated with the pixel. The CPU 102 then collapses multiple overlapping detections within and between the scaled images 620 via non-maxima suppression to determine the final detections. For each final detection, the CPU 102 computes an overall object confidence value based on the weighted sum of the average of the per-pixel, per-scaled image object confidence values of overlapping detections and the number of overlapping detections. Finally, the CPU 102 performs further processing such as object definition, object classification, tracking, etc.

In alternate embodiments, any processing unit or combination of processing units may perform any of the operations included in the object detection process. For example, in some embodiments, the CPU 102 processes the smallest of the scaled images 620 included in the image pyramid 600. In other embodiments, the CPU 102 copies unprocessed memory patches 650 to the PP memory 204 as the PPU 202 is applying the RF classifier 510 to one or more memory patches 650. In alternate embodiments, any processing unit may determine detections and the collapse multiple detections in any technically feasible fashion.

Figure 7A:
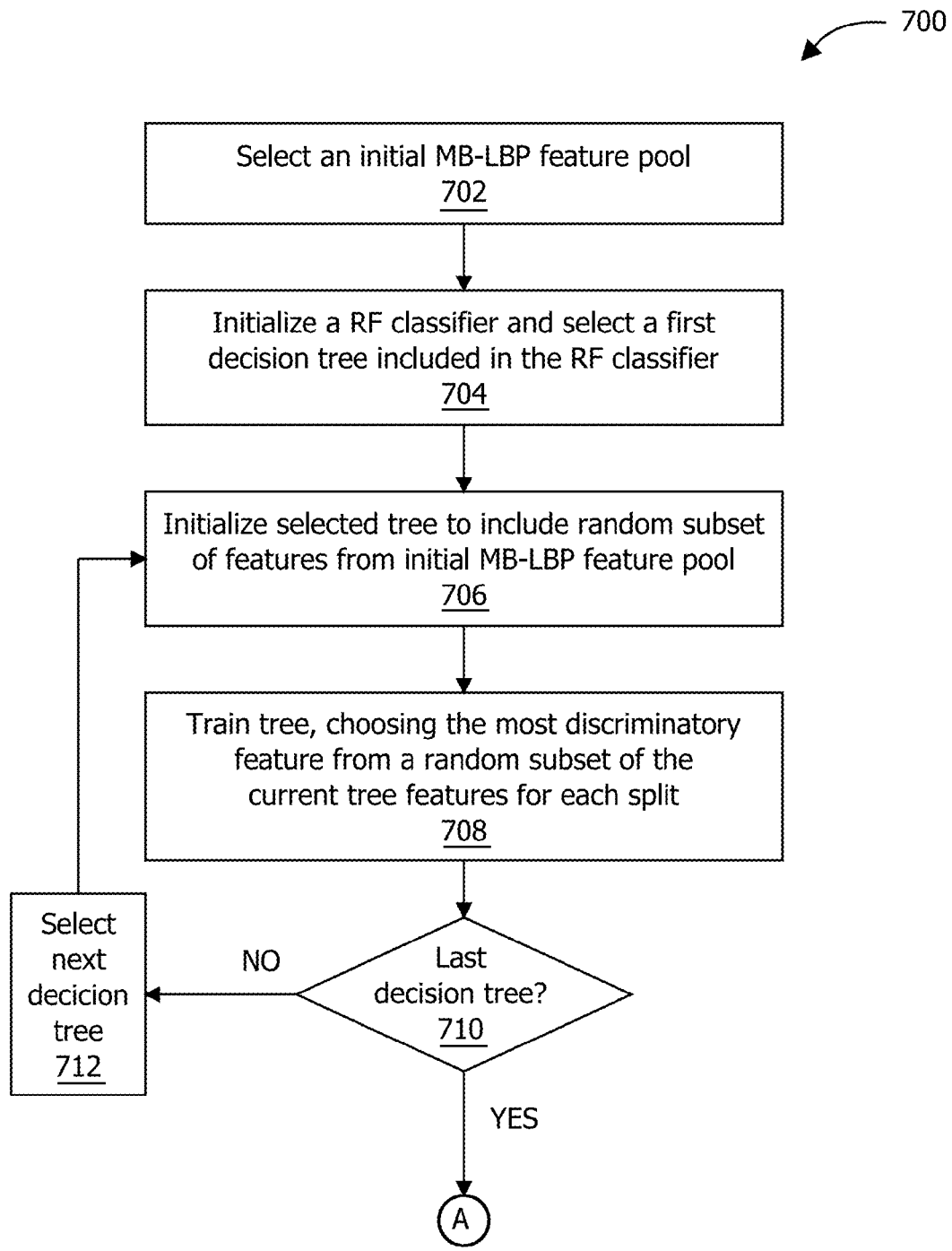
FIGS. 7A-7B set forth a flow diagram of method steps for training a random forest classifier, according to one embodiment of the present invention.
Figure 7B:
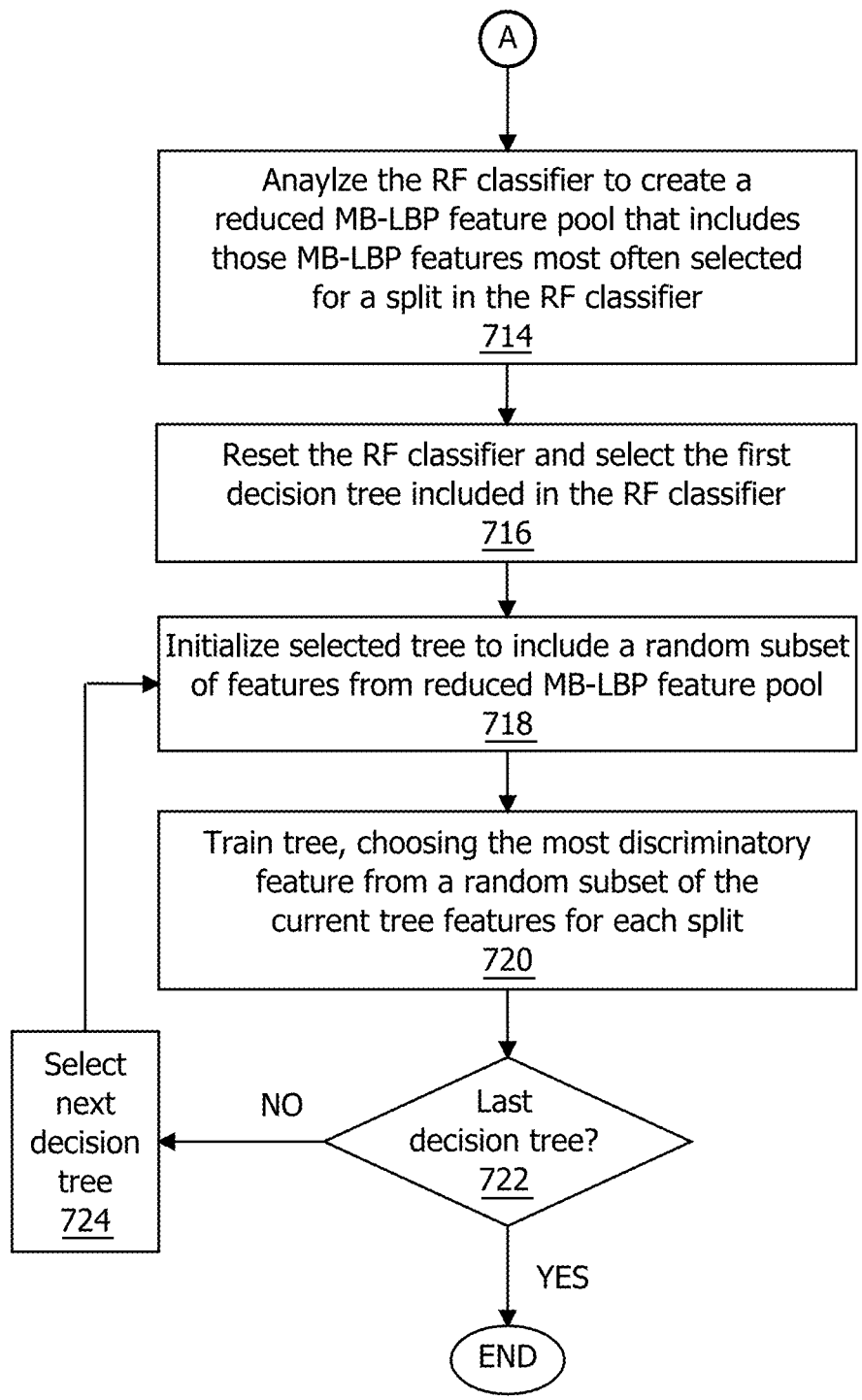

FIGS. 7A-7B set forth a flow diagram of method steps for training a random forest classifier, according to one embodiment of the present invention. Although the method steps are described with reference to the systems of FIGS. 1-6, persons skilled in the art will understand that any system configured to implement the method steps, in any order, falls within the scope of the present invention.

As shown, a method 700 begins at step 702, where the CPU 102 randomly selects an initial MB-LBP feature pool 505 from the set of all possible MB-LBP features 410. At step 704, the CPU 102 initializes the RF classifier 510 to an untrained state. The CPU 102 then selects the first decision tree 520 included in the RF classifier 510. At step 706, the CPU 102 initializes the selected decision tree 520 to include a random subset of MB-LBP features 410 from the initial MB-LBP feature pool 505.

At step 708, the CPU 102 trains the selected decision tree 520 on a set of positive images that include objects of interest and a set of negative images that do not include objects of interest. At each split in the selected decision tree 520, the CPU 102 randomly selects a subset of the MB-LBP feature 410 included in the decision tree 520. The CPU 102 then analyzes this subset of the initial MB-LBP feature pool 505 to determine the MB-LBP feature 410 that most accurately discriminates between the positive images and the negative images. The CPU 102 selects this locally most discriminatory MB-LBP feature 410 for the split in the selected decision tree 520. If, at step 710, the CPU 102 determines that the selected decision tree 520 is not the last decision tree 520 included in the RF classifier 510, then the method 700 proceeds to step 712. At step 712, the CPU 102 selects the next decision tree 520 included in the RF classifier 510, and the method 700 returns to step 706. The CPU 102 repeatedly cycles through steps 706 through 712, training each decision tree 520 until the CPU 102 has finished training all of the decision trees 520 included in the RF classifier 510.

If, at step 710, the CPU 102 determines that the selected decision tree 520 is the last decision tree 520 included in the RF classifier 510, then the method 700 proceeds to step 714. At step 714, the CPU 102 analyzes the RF classifier 510 and selects the subset of MB-LBP features 410 that appear most often as a split in the decision trees 520. Together, these selected MB-LBP features 410 form the reduced MB-LBP feature pool 565. At step 716, the CPU 102 resets the RF classifier 510 to an untrained state. In some embodiments, the CPU 102 also reduces the number of decision trees 520 included in the RF classifier 510. Subsequently, the CPU 102 selects the first decision tree 520 included in the RF classifier 510. At step 718, the CPU 102 initializes the selected decision tree 520 to include a random subset of the MB-LBP features 410 from the reduced MB-LBP feature pool 565.

At step 720, the CPU 102 retrains the selected decision tree 520 on the positive images and the negative images. At each split in the selected decision tree 520, the CPU 102 randomly selects a subset of the MB-LBP features 410 included in the decision tree 520. The CPU 102 then analyzes this subset of the reduced MB-LBP feature pool 565 to determine the MB-LBP feature 410 that most accurately discriminates between the positive images and the negative images. The CPU 102 selects this locally most discriminatory MB-LBP feature 410 for the split in the selected decision tree 520. If, at step 722, the CPU 102 determines that the selected decision tree 520 is not the last decision tree 520 included in the RF classifier 510, then the method 700 proceeds to step 724. At step 724, the CPU 102 selects the next decision tree 520 included in the RF classifier 510, and the method 700 returns to step 718. The CPU 102 repeatedly cycles through steps 718 through 724, retraining each decision tree 520 until the CPU 102 has finished retraining all of the decision trees 520 included in the RF classifier 510. If, at step 722, the CPU 102 determines that the selected decision tree 520 is the last decision tree 520 included in the RF classifier 510, then the method 700 terminates. In alternate embodiments, steps 714 through 724 may be repeated any number of times—improving the accuracy of the RF classifier 510 with each repetition.

Figure 8A:
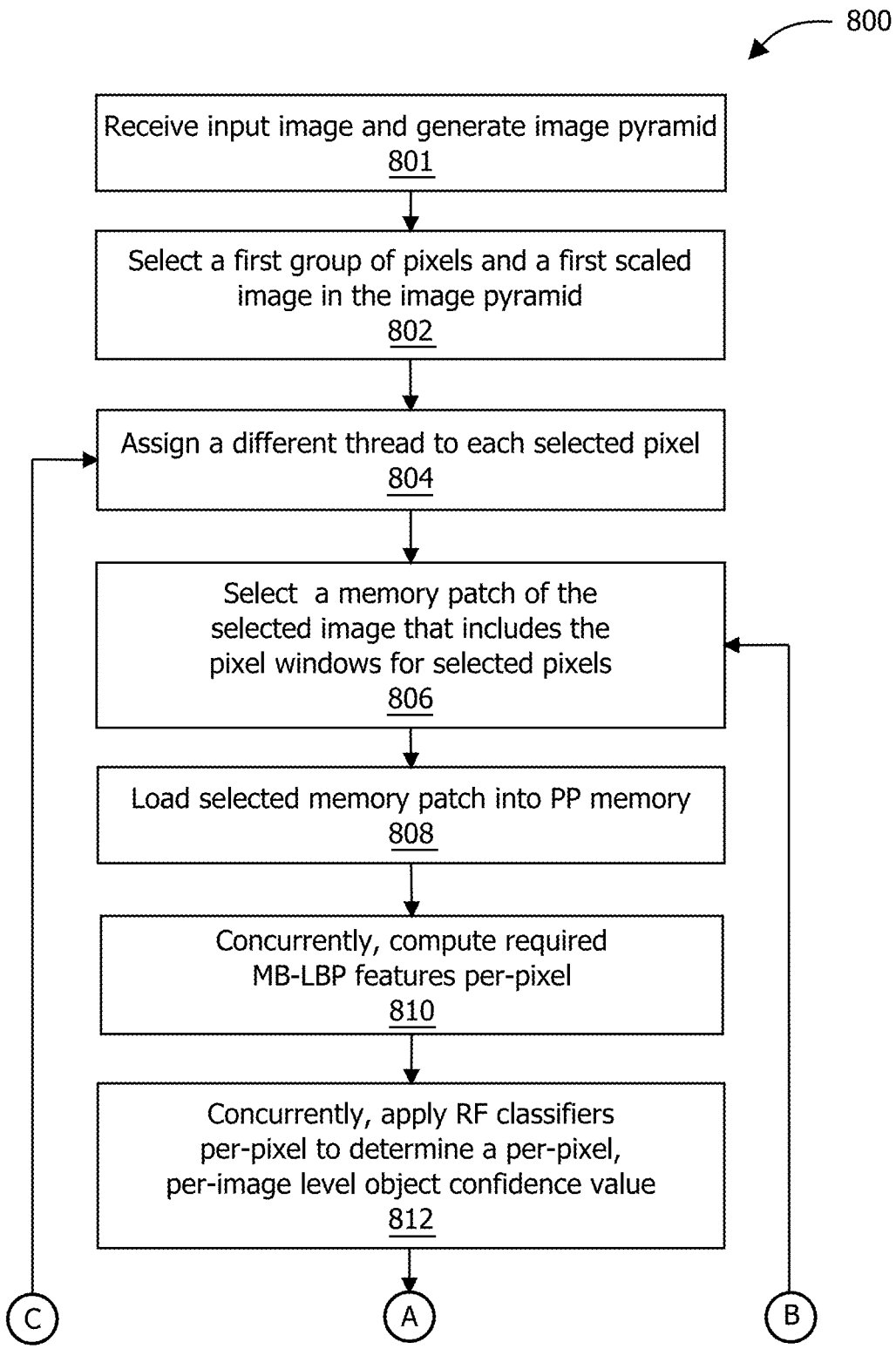
FIGS. 8A-8B set forth a flow diagram of method steps for performing object detection operations via a parallel processing architecture, according to one embodiment of the present invention.
Figure 8B:
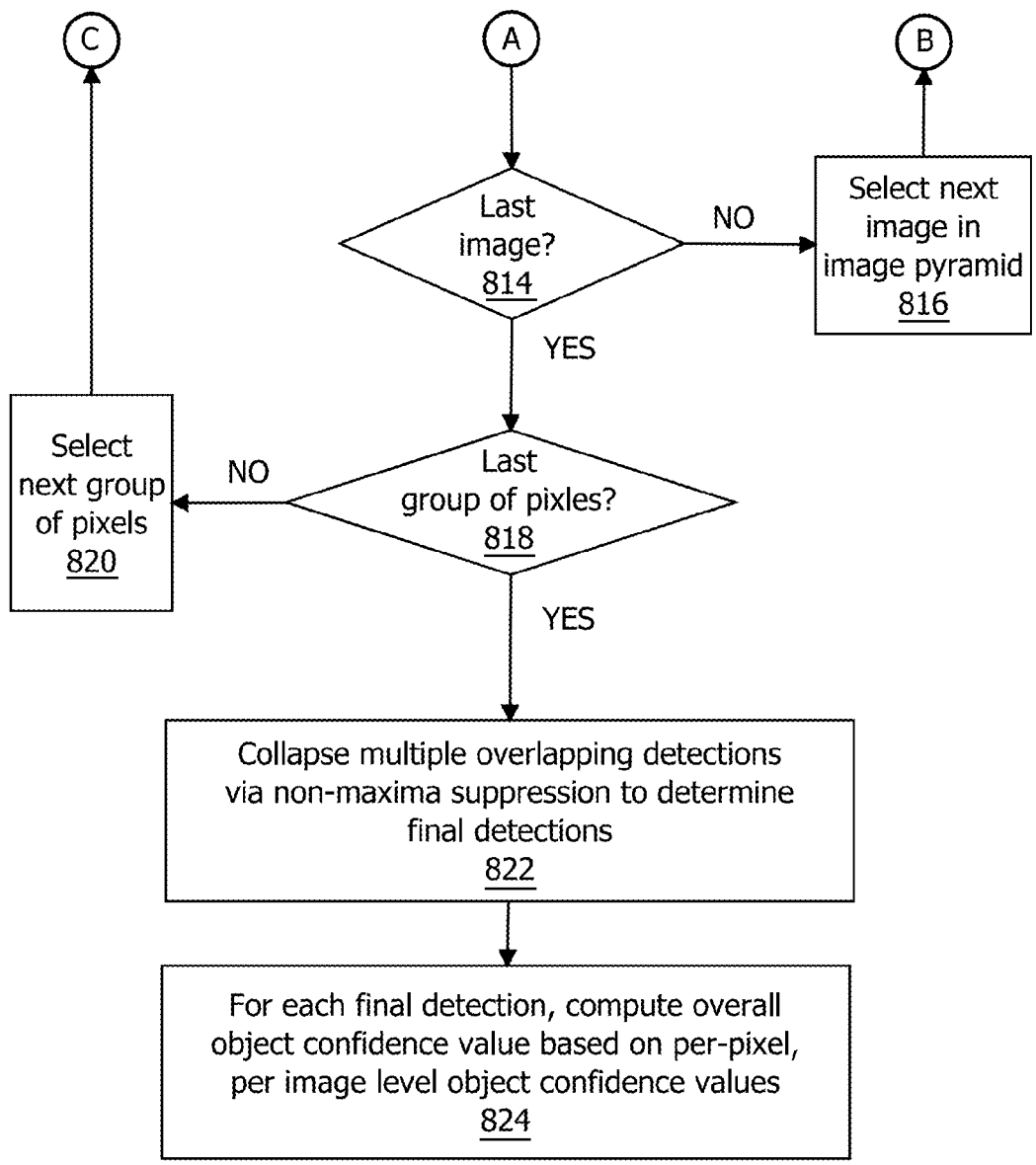

FIGS. 8A-8B set forth a flow diagram of method steps for performing object detection via a parallel processing architecture, according to one embodiment of the present invention. Although the method steps are described with reference to the systems of FIGS. 1-6, persons skilled in the art will understand that any system configured to implement the method steps, in any order, falls within the scope of the present invention.

As shown, a method 800 begins at step 801, where the CPU 102 receives an input image and generates the associated image pyramid 600. At step 802, the PPU 202 selects a first group of pixels and the first scaled image 620 included in the image pyramid 600. At step 804, the PPU 202 assigns a different thread to process each of the pixels included in the selected group of pixels. At step 806, the PPU 202 selects the memory patch 650 included in the selected scaled image 620 that includes the pixel windows 408 associated with the selected group of pixels. At step 808, the PPU 202 copies the memory patch 650 from the system memory 104 to the PP memory 204.

At step 810, the PPU 202 causes the threads assigned to the selected group of pixels to concurrently compute the required per-pixel MB-LBP features 410 associated with the assigned pixels based on the appropriate pixel windows 408. At step 812 the PPU 202 causes the threads assigned to the selected group of pixels to concurrently apply the RF classifier 520 to the assigned pixels. As part of this step, each thread sequentially applies each decision tree 520 included in the RF classifier 510 to the assigned pixel. Each thread then generates an object confidence value (specific to the assigned pixel and the selected scaled image 620) that represents the likelihood of the presence of the object at the location of the assigned pixel based on the individual determinations of each of the decision trees 520.

At step 814, if the PPU 202 determines that the selected scaled image 620 is not the last scaled image 620 included in the image pyramid 600, then the method 800 proceeds to step 816. At step 816, the PPU 202 selects the next scaled image 620 included in the image pyramid 600, and the method 800 returns to step 806. The PPU 202 repeatedly cycles through steps 806 through 816, processing the memory patch 650 associated with both the selected group of pixels and the selected scaled image 620 until the PPU 202 has processed the selected group of pixels for all of the scaled images 620 included in the image pyramid 600.

If, at step 814, the PPU 202 determines that the selected scaled image 620 is the last scaled image 620 included in the image pyramid 600, then the method 800 proceeds to step 818. At step 816, if the PPU 202 determines that the selected group of pixels is not the last group of pixels included in the image pyramid 600, then the method 800 proceeds to step 820. At step 820, the PPU 202 selects the next group of pixels included in the image pyramid 600, and the method 800 returns to step 804. The PPU 202 repeatedly cycles through steps 804 through 818, processing each group of pixels across all of the scaled images 620 until the PPU 202 has processed all of the pixels across all of the scaled images 620 included in the image pyramid 600.

If, at step 818, the PPU 202 determines that the selected group of pixels is the last group of pixels included in the image pyramid 600, then the method 800 proceeds to step 822. At step 822, the CPU 102 determines detections based on the per-pixel, per-scaled image object confidence values computed by the PPU 202. The CPU 102 then collapses multiple overlapping detections via non-maxima suppression to determine the final detections. At step 824, for each final detection, the CPU 102 computes an overall object confidence value based on the weighted sum of the average of the per-pixel, per-scaled image object confidence values of overlapping detections and the number of overlapping detections.

In sum, in the training step of an object detection algorithm, a computer system trains a random forest (RF) classifier in two phases—an initial feature phase and a reduced feature phase. The RF classifier includes multiple independent decision trees, each of which is structurally identical. In the initial feature phase, the computer system randomly selects an initial pool of multi-block local binary pattern (MB-LBP) features from the set of all possible MB-LBP features that describe the object. The computer system trains each of the decision trees independently on a random subset of the initial pool of MB-LPB features, selecting the most discriminatory MB-LBP feature for each split in the tree.

After initially training the RF classifier, the computer system analyzes the decision trees included in the RF classifier to determine the MB-LBP features that are most often selected for splits. Together, these MB-LBP features form a reduced MB-LBP feature pool. In the reduced feature phase, the computer system resets the RF classifier to an initial state and retrains each of the decision trees independently on a feature subset randomly selected from the reduced MB-LBP feature pool. Again, the computer system selects the most discriminatory MB-LBP features for each split in the tree. The RF classifier produced by this two phase training process includes multiple independent decision trees of equal depth, independently trained based on a deterministically optimized subset of MB-LBP features.

Subsequently, in the execution step of the object detection algorithm, a CPU generates an image pyramid of scaled images based on an input image. A GPU within the computer system concurrently processes multiple image pixels included in each of the scaled images. In one instance, the GPU assigns a different thread to process each pixel by applying the RF classifier. Each of these threads computes the MB-LBP features associated with a pixel window surrounding the pixel location, sequentially applies each decision tree included in the RF classifier to the MB-LBP features, and generates a per-pixel, per-scaled image object confidence value. The per-pixel, per-scaled image object confidence value represents the likelihood of the presence of the object at the pixel location. If the CPU determines that an object confidence value is greater than a predetermined threshold, then the CPU considers the object confidence value to represent a "detection" associated with the pixel. The CPU collapses multiple overlapping detections within and between scaled images via non-maxima suppression to determine the final detections. For each final detection, the CPU then computes an overall object confidence value based on the weighted sum of the average of the per-pixel, per-scaled image object confidence values of overlapping detections and the number of overlapping detections.

Advantageously, performing object detection using a RF classifier that includes structurally identical decision trees leverages the parallel architecture of the GPU. Notably, applying the RF classifier to each pixel entails performing equivalent mathematical operations on each pixel. Consequently, performing object detection using a RF classifier exploits the ability of the GPU to optimally and concurrently perform the same instruction on multiple pixels. In addition, by employing a two-phase training procedure to optimize the MB-LBP features used to train the RF classifier, the accuracy of the RF classifier is improved compared to typical conventionally trained classifiers. Thus, the techniques described herein enable more efficient and accurate object detection than conventional object detection approaches.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as compact disc read only memory (CD-ROM) disks readable by a CD-ROM drive, flash memory, read only memory (ROM) chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

Therefore, the scope of embodiments of the present invention is set forth in the claims that follow.

The invention claimed is:

1. A computer-implemented method for identifying an object in one or more images, the method comprising:
   selecting a first subset of pixels included in a first image;
   associating a first execution thread with a first pixel included in the first subset of pixels;
   computing, via the first execution thread, a first set of multi-block local binary pattern (MB-LBP) features that are associated with a first pixel window, wherein the first pixel window comprises a plurality of pixels that are proximate to the first pixel;
   causing the first execution thread to apply a first decision tree included in a plurality of decision trees to the first pixel based on the first set of MB-LBP features to determine a first likelihood that the first pixel is associated with a first object and thereby indicating a first probability that the first object is included in the first image, wherein the plurality of decision trees correspond to a random forest classifier;
   selecting a second subset of pixels included in a second image;
   associating a second execution thread with a second pixel included in the second subset of pixels;
   causing the second execution thread to apply the first decision tree to the second pixel to determine a second likelihood that the second pixel is associated with the first object and thereby indicating a second probability that the first object is included in the second image, wherein the first likelihood and the second likelihood represent spatially overlapping detections; and
   computing an aggregated likelihood that the first object is included in the first image based on at least the first likelihood and the second likelihood.

2. The method of claim 1, further comprising:
   associating a third execution thread with a third pixel included in the first subset of pixels; and
   causing the third execution thread to apply the first decision tree to the third pixel to determine a third likelihood that the third pixel is associated with the first object and thereby indicating a third probability that the first object is included in the first image.

3. The method of claim 2, wherein the first execution thread applies the first decision tree to the first pixel substantially in parallel with the third execution thread applying the first decision tree to the third pixel.

4. The method of claim 1, further comprising:
   causing the first execution thread to apply a second decision tree included in the plurality of decision trees to the first pixel to determine a third likelihood that the first pixel is associated with the first object and thereby indicating a third probability that the first object is included in the first image; and
   computing an aggregated likelihood that the first pixel is associated with the first object based on the first likelihood and the third likelihood.

5. The method of claim 1, wherein the second image is a scaled version of the first image.

6. The method of claim 5, wherein the first likelihood and the second likelihood represent spatially overlapping detections included in a plurality of overlapping detections, and the aggregated likelihood is computed based on a weighted sum of all likelihoods that are associated with the plurality of overlapping detections and the number of overlapping detections included in the plurality of overlapping detections.

7. A non-transitory computer-readable storage medium including instructions that, when executed by a processing unit, cause the processing unit to identify an object in one or more images by performing the steps of:
   selecting a first subset of pixels included in a first image;
   associating a first execution thread with a first pixel included in the first subset of pixels;
   computing, via the first execution thread, a first set of multi-block local binary pattern (MB-LBP) features that are associated with a first pixel window, wherein the first pixel window comprises a plurality of pixels that are proximate to the first pixel;
   causing the first execution thread to apply a first decision tree included in a plurality of decision trees to the first pixel based on the first set of MB-LBP features to determine a first likelihood that the first pixel is associated with a first object and thereby indicating a first probability that the first object is included in the first image, wherein the plurality of decision trees correspond to a random forest classifier;
   selecting a second subset of pixels included in a second image;
   associating a second execution thread with a second pixel included in the second subset of pixels;
   causing the second execution thread to apply the first decision tree to the second pixel to determine a second likelihood that the second pixel is associated with the first object and thereby indicating a second probability that the first object is included in the second image, wherein the first likelihood and the second likelihood represent spatially overlapping detections; and
   computing an aggregated likelihood that the first object is included in the first image based on at least the first likelihood and the second likelihood.

8. The non-transitory computer-readable storage medium of claim 7, further comprising:
   associating a third execution thread with a third pixel included in the first subset of pixels; and
   causing the third execution thread to apply the first decision tree to the third pixel to determine a third likelihood that the third pixel is associated with the first object and thereby indicating a third probability that the first object is included in the first image.

9. The non-transitory computer-readable storage medium of claim 8, wherein the first execution thread applies the first decision tree to the first pixel substantially in parallel with the third execution thread applying the first decision tree to the third pixel.

10. The computer-readable storage medium of claim 7, further comprising:
    causing the first execution thread to apply a second decision tree included in the plurality of decision trees to the first pixel to determine a third likelihood that the first pixel is associated with the first object and thereby indicating a third probability that the first object is included in the first image; and
    computing an aggregated likelihood that the first pixel is associated with the first object based on the first likelihood and the third likelihood.

11. The non-transitory computer-readable storage medium of claim 7, wherein the second image is a scaled version of the first image.

12. The non-transitory computer-readable storage medium of claim 11, wherein the first likelihood and the second likelihood represent spatially overlapping detections included in a plurality of overlapping detections, and the aggregated likelihood is computed based on a weighted sum of all likelihoods that are associated with the plurality of overlapping detections and the number of overlapping detections included in the plurality of overlapping detections.

13. The non-transitory computer-readable storage medium of claim 7, wherein each of the plurality of decision trees is structurally identical and has a depth of at least three node levels.

14. The non-transitory computer-readable storage medium of claim 7, wherein computing the first set of MB-LBP features that are associated with the first pixel window comprises:
    determining a threshold pixel value associated with the first pixel window;
    assigning a first value to pixels included in the first pixel window having a value that is above the threshold pixel value; and
    assigning a second value to pixels included in the first pixel window having a value that is below the threshold pixel value.

15. The non-transitory computer-readable storage medium of claim 14, wherein determining the threshold pixel value comprises determining an average greyscale value of a block of pixels included in the first pixel window.

16. A computing device configured to train random forest classifiers for object detection, the system comprising:
    a first memory that includes a plurality of decision trees, wherein the plurality of decision trees are structurally identical and correspond to a random forest classifier; and
    a processing unit coupled to the memory and configured to:
    select a first subset of pixels included in a first image;
    associate a first execution thread with a first pixel included in the first subset of pixels;

compute, via the first execution thread, a first set of multi-block local binary pattern (MB-LBP) features that are associated with a first pixel window, wherein the first pixel window comprises a plurality of pixels that are proximate to the first pixel;

cause the first execution thread to apply a first decision tree included in a plurality of decision trees to the first pixel based on the first set of MB-LBP features to determine a first likelihood that the first pixel is associated with a first object and thereby indicating a first probability that the first object is included in the first image, wherein the plurality of decision trees correspond to a random forest classifier;

select a second subset of pixels included in a second image;

associate a second execution thread with a second pixel included in the second subset of pixels;

cause the second execution thread to apply the first decision tree to the second pixel to determine a second likelihood that the second pixel is associated with the first object and thereby indicating a second probability that the first object is included in the second image, wherein the first likelihood and the second likelihood represent spatially overlapping detections; and compute an aggregated likelihood that the first object is included in the first image based on at least the first likelihood and the second likelihood.

17. The computing device of claim 16, wherein causing the first execution thread to apply the first decision tree comprises:

identifying a plurality of windows of pixels that is associated with the first subset of pixels, wherein each window of pixels specifies a predetermined number of proximally located pixels;

copying a memory patch from a second memory to the first memory, wherein the memory patch includes image data associated with the plurality of windows of pixels;

causing the first execution thread to identify a first window of pixels included in the plurality of window of pixels based on the first pixel;

causing the first execution thread to compute a first set of features based on the image data included in the memory patch and associated with the first window of pixels; and causing the first execution thread to process the first decision tree based on the first set of features.

* * * * *